United States Patent
Westmoreland et al.

(10) Patent No.: US 9,261,279 B2
(45) Date of Patent: Feb. 16, 2016

(54) LIQUID CARTRIDGE WITH PASSIVELY FUELED PREMIXED AIR BLAST CIRCUIT FOR GAS OPERATION

(75) Inventors: James Harold Westmoreland, Greer, SC (US); Gregory Allen Boardman, Greer, SC (US); Patrick Benedict Melton, Hendersonville, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 937 days.

(21) Appl. No.: 13/480,896

(22) Filed: May 25, 2012

(65) Prior Publication Data

US 2013/0312422 A1 Nov. 28, 2013

(51) Int. Cl.
*F23R 3/28* (2006.01)
*F23R 3/36* (2006.01)
*F23D 14/02* (2006.01)
*F02C 7/22* (2006.01)

(52) U.S. Cl.
CPC . *F23R 3/286* (2013.01); *F23R 3/36* (2013.01); *F02C 7/222* (2013.01); *F05D 2240/128* (2013.01); *F23D 14/02* (2013.01)

(58) Field of Classification Search
CPC ............ F23R 3/286; F23R 3/34; F23R 3/343; F23R 3/35; F23R 3/32; F23R 3/12; B01F 5/04; B01F 5/0403; F23D 14/64; F23C 7/00
USPC ............ 60/737, 738, 740, 746, 774; 239/310, 239/311, 427, 427.3, 428, 429, 430, 431, 239/433, 434
See application file for complete search history.

(56) References Cited

U.S. PATENT DOCUMENTS

| | | | |
|---|---|---|---|
| 4,262,482 A * | 4/1981 | Roffe et al. | 60/736 |
| 5,361,586 A * | 11/1994 | McWhirter et al. | 60/737 |
| 5,487,659 A | 1/1996 | Eroglu et al. | |
| 5,713,205 A | 2/1998 | Sciocchetti et al. | |
| 5,836,164 A * | 11/1998 | Tsukahara et al. | 60/733 |
| 6,609,380 B2 | 8/2003 | Mick et al. | |
| 8,157,189 B2 * | 4/2012 | Johnson et al. | 239/132.5 |
| 8,205,452 B2 * | 6/2012 | Boardman et al. | 60/737 |
| 8,613,197 B2 * | 12/2013 | Uhm et al. | 60/746 |
| 2006/0080966 A1 * | 4/2006 | Widener | 60/775 |
| 2010/0031662 A1 * | 2/2010 | Zuo | 60/740 |
| 2010/0186413 A1 * | 7/2010 | Lacy et al. | 60/740 |
| 2011/0016866 A1 * | 1/2011 | Boardman et al. | 60/730 |
| 2011/0083439 A1 * | 4/2011 | Zuo et al. | 60/737 |
| 2012/0055167 A1 * | 3/2012 | Johnson et al. | 60/776 |
| 2012/0198812 A1 * | 8/2012 | Uhm et al. | 60/39.463 |
| 2013/0036743 A1 * | 2/2013 | Khan et al. | 60/772 |
| 2013/0084534 A1 * | 4/2013 | Melton et al. | 431/2 |
| 2013/0101943 A1 * | 4/2013 | Uhm et al. | 431/8 |

* cited by examiner

*Primary Examiner* — Phutthiwat Wongwian
*Assistant Examiner* — Rene Ford
(74) *Attorney, Agent, or Firm* — Nixon & Vanderhye P.C.

(57) ABSTRACT

A gas/liquid fuel nozzle assembly includes a premixing tube bundle having an array of mixing tubes, a fuel plenum delivering fuel to the mixing tubes, a cartridge tube disposed within the fuel plenum, and a liquid fuel cartridge disposed in the cartridge tube. The liquid fuel cartridge is spaced from the cartridge tube to define an annulus. The cartridge tube and the fuel plenum are constructed in fluid communication such that gas fuel in the plenum is injected into the annulus.

4 Claims, 2 Drawing Sheets

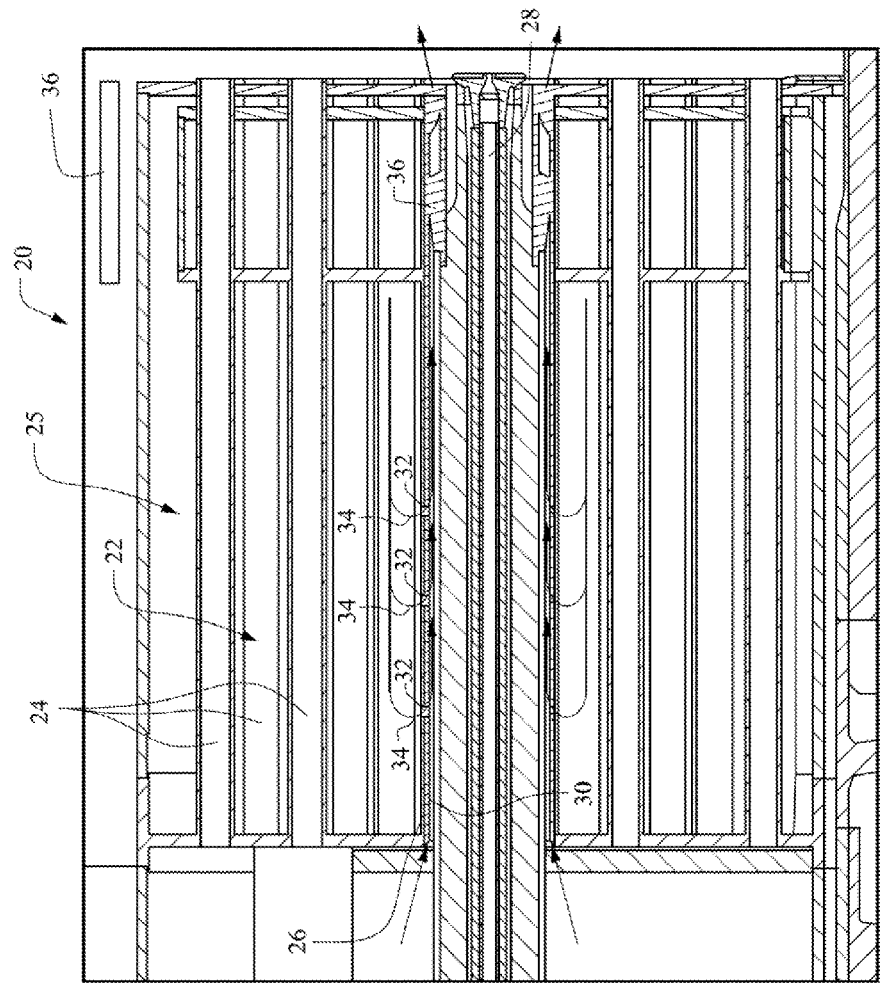

LIQUID CARTRIDGE WITH PASSIVELY FUELED PREMIXED AIR BLAST CIRCUIT FOR GAS OPERATION

BACKGROUND OF THE INVENTION

The invention relates generally to gas turbines and, more particularly, to a gas turbine operable in a dual fuel mode where a liquid cartridge air blast circuit is passively fueled for gas operation.

Gas turbine engines typically include a compressor for compressing an incoming airflow. The airflow is mixed with fuel and ignited in a combustor for generating hot combustion gases. The combustion gases in turn flow to a turbine. The turbine extracts energy from the gases for driving a shaft. The shaft powers the compressor and generally another element such as an electrical generator.

In some designs, the combustors operate with backup fuel such as liquid fuel. A liquid fuel cartridge is inserted through a micromixing fuel nozzle assembly upstream of a combustion zone. When the turbine is not running with liquid fuel, air is purged through the liquid cartridges. A problem with the existing design, however, is that the air in the liquid cartridges contributes to NOx production in the combustion zone, which is undesirable.

It would be advantageous to address this problem by bleeding gas fuel into an annulus of the liquid cartridge to mix with air during gas only operation of the turbine.

BRIEF DESCRIPTION OF THE INVENTION

In an exemplary embodiment, a gas/liquid fuel nozzle assembly includes a premixing tube bundle having an array of mixing tubes, a fuel plenum to deliver fuel to the mixing tubes, a cartridge tube disposed within the fuel plenum, and a liquid fuel cartridge disposed in the cartridge tube. The liquid fuel cartridge is spaced from the cartridge tube to define an annulus. The cartridge tube and the fuel plenum are constructed in fluid communication such that gas fuel in the plenum is injected into the annulus.

In another exemplary embodiment, a micromixer in a dual fuel gas turbine that delivers fuel and air to a combustor includes a premixing tube bundle including an array of mixing tubes; a fuel plenum to deliver fuel to the mixing tubes via a plurality of gas fuel extraction holes; a cartridge tube disposed within the plenum and including a plurality of gas fuel injection holes; and a liquid fuel cartridge disposed in the cartridge tube. Gas fuel in the plenum is injected via the gas fuel extraction holes and the gas fuel injection holes into an annulus between the liquid fuel cartridge and the cartridge tube.

In yet another exemplary embodiment, a method of operating the dual fuel gas turbine includes the steps of (a) operating the dual fuel gas turbine in a gas fuel mode; (b) during step (a), flowing air through the liquid fuel cartridge and the annulus; and (c) during step (a), injecting gas fuel from the plenum into the annulus.

BRIEF DESCRIPTION OF THE DRAWINGS

FIG. 2 is a cross section through a micromixer multi-tube assembly in a dual fuel nozzle.

DETAILED DESCRIPTION OF THE INVENTION

Figure 1:
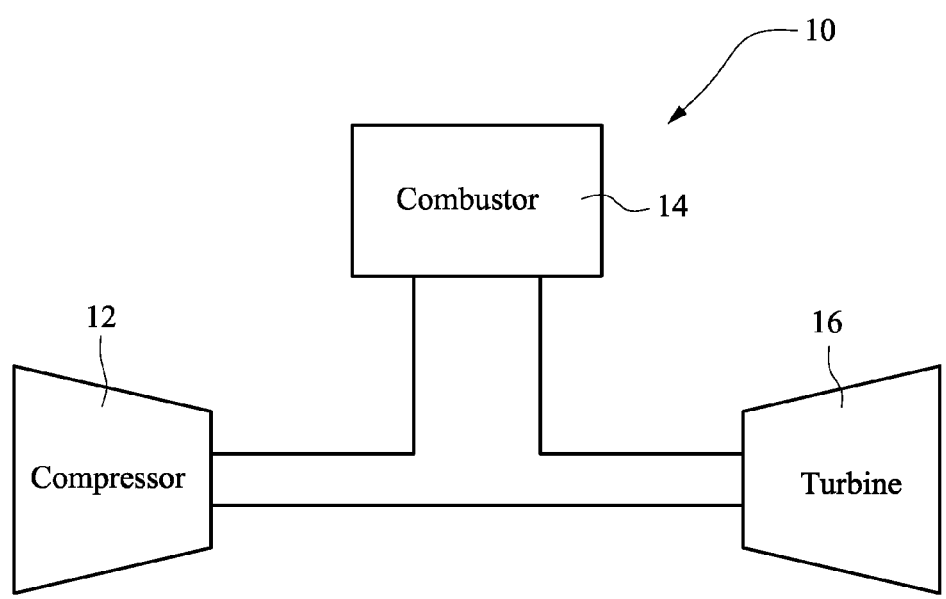
FIG. 1 is a simplified schematic of a gas turbine.

FIG. 1 illustrates a typical gas turbine 10. As shown, the gas turbine 10 generally includes a compressor 12 at the front, one or more combustors 14 around the middle, and a turbine 16 at the rear. The compressor 12 and the turbine 16 typically share a common rotor. The compressor 12 pressurizes inlet air, which is then turned in direction or reverse flowed to the combustors 14 where it is used to cool the combustor and also to provide air to the combustion process. The combustors 14 inject fuel into the flow of compressed working fluid and ignite the mixture to produce combustion gases having a high temperature, pressure and velocity. The combustion gases exit the combustors 14 and flow to the turbine 16 where they expand to produce work.

FIG. 2 is a cross-sectional view through the micromixer multi-tube assembly in a gas/liquid fuel nozzle. A concept of the preferred embodiments takes the no-atomizing-air liquid cartridge design and applies it to a premixing tube bundle sector, micromixer, head end. The fuel nozzle 20 includes a premixing tube bundle 22 including an array of mixing tubes 24. A fuel plenum 25 delivers fuel to the mixing tubes 24. A cartridge tube 26 is disposed within the fuel plenum 25, and a liquid fuel cartridge 28 is disposed in the cartridge tube 26. The liquid fuel cartridge 28 is spaced from the cartridge tube 26 to define an annulus 30. The cartridge tube 26 and the fuel plenum 25 are constructed in fluid communication such that gas fuel in the plenum 25 is injected into the annulus 30.

In a preferred construction, the cartridge tube includes a plurality of gas fuel injection holes 32 that allow gas fuel to be injected from the fuel plenum to the annulus 30. The fuel plenum 25 includes a plurality of gas fuel extraction holes 34 that release gas fuel from the mixing tube(s).

As shown, the gas fuel is injected radially inward into the annulus 30 to premix gas fuel and air prior to injection into the combustion chamber. The design allows the air in the liquid cartridge during gas only operation of the turbine to be premixed with gas fuel before entering the combustor, allowing the combustor to produce less NOx emissions, while operating on gas fuel.

The amount of gas injection could be tailored, either passively with effective-flow area selection, or actively using another separate fuel circuit 36 (shown schematically in FIG. 2), to produce a fuel-air mixture that is the same, less than, or greater than the surrounding micromixer tubes. In a typical operation, the fuel/air in the annulus would be leaner than the surrounding mixing tubes.

The annulus 30 may be designed to have swirled or non-swirled air to enhance the performance of the nozzle. In this context, a vane 36 may be disposed in the annulus 30 that serves to swirl air and gas-fuel prior to exiting the annulus 30.

The resulting structure provides for added efficiency as no atomizing air subsystem is required for power, is less expensive, and achieves lower emissions by lower gas-fuel flame temperatures.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:
1. A micromixer in a dual fuel gas turbine that delivers fuel and air to a combustor, the micromixer comprising:
 a premixing tube bundle including an array of mixing tubes;
 a fuel plenum that delivers fuel to the mixing tubes, the fuel plenum including a plurality of gas fuel extraction holes;
 a cartridge tube disposed within the plenum, the cartridge tube including a plurality of gas fuel injection holes; and a liquid fuel cartridge disposed in the cartridge tube,
wherein gas fuel in the plenum is injected via the gas fuel extraction holes and the gas fuel injection holes into an annulus between the liquid fuel cartridge and the cartridge tube.

2. A micromixer according to claim 1, further comprising a vane disposed in the annulus, the vane swirling air and gas fuel prior to exiting the annulus.

3. A micromixer according to claim 1, wherein an amount of gas fuel injected into the annulus is tailored.

4. A micromixer according to claim 1, wherein the amount of gas fuel injected into the annulus is tailored either passively with effective flow area selection or actively using a separate fuel circuit.

* * * * *

UNITED STATES PATENT AND TRADEMARK OFFICE
CERTIFICATE OF CORRECTION

| | | |
|---|---|---|
| PATENT NO. | : 9,261,279 B2 | |
| APPLICATION NO. | : 13/480896 | |
| DATED | : February 16, 2016 | |
| INVENTOR(S) | : Westmoreland et al. | |

It is certified that error appears in the above-identified patent and that said Letters Patent is hereby corrected as shown below:

In the specification

At column 2, line 25, insert --26-- after "the cartridge tube".

At column 2, line 27, insert --25-- after "the fuel plenum".

Signed and Sealed this
Tenth Day of May, 2016

Michelle K. Lee
*Director of the United States Patent and Trademark Office*